(12) United States Patent
Chen et al.

(10) Patent No.: US 9,985,461 B2
(45) Date of Patent: May 29, 2018

(54) SYSTEMS CAPABLE OF SELF-HARVESTING ENERGY FROM WIRELESS DEVICES AND METHODS OF USING THE SAME

(71) Applicant: Ohio State Innovation Foundation, Columbus, OH (US)

(72) Inventors: Chi-Chih Chen, Dublin, OH (US); Roland Kyle Tallos, Polk, OH (US); Can E. Koksal, New Albany, OH (US); Ness B. Shroff, Dublin, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 40 days.

(21) Appl. No.: 14/882,754

(22) Filed: Oct. 14, 2015

(65) Prior Publication Data

US 2016/0134150 A1 May 12, 2016

Related U.S. Application Data

(60) Provisional application No. 62/063,432, filed on Oct. 14, 2014, provisional application No. 62/171,099, (Continued)

(51) Int. Cl.
*H02J 7/00* (2006.01)
*H01F 27/42* (2006.01)
(Continued)

(52) U.S. Cl.
CPC ............. *H02J 7/025* (2013.01); *H02J 50/20* (2016.02); *H04B 1/3883* (2013.01)

(58) Field of Classification Search
CPC ................................................... H02J 7/025
(Continued)

(56) References Cited

U.S. PATENT DOCUMENTS

2013/0043734 A1* 2/2013 Stone .................. H04B 5/0037
307/104
2013/0106341 A1 5/2013 Eaton et al.
(Continued)

FOREIGN PATENT DOCUMENTS

KR 20110135507 A 12/2011
KR 20140082628 A 6/2014
KR 20140094901 A 7/2014

OTHER PUBLICATIONS

Chi-Chih Chen, J.L. Volakis, U. Olgun, "Wireless power harvesting with planar rectennas for 2.45 GHz RFIDs," 2010 URSI International Symposium on Electromagnetic Theory (EMTS), Aug. 16, 2010. (http://ieeexplore.ieee.org/xpls/abs_all.jsp?arnumber=5637008&tag=1).
(Continued)

*Primary Examiner* — Edward Tso
*Assistant Examiner* — Ahmed Omar
(74) *Attorney, Agent, or Firm* — Benesch, Friedlander, Coplan & Aronoff LLP

(57) ABSTRACT

A system and method for self-harvesting energy from a wireless device and supplementing the battery power of the wireless device using the self-harvested energy includes the steps of collecting at least a portion of radio frequency signals transmitted by the wireless device; converting the collected radio frequency signals from radio frequency signals to direct current energy; further converting the direct current energy to energy compatible with charging requirements for a battery electrically connected to the wireless device; and transferring the compatible energy to the battery of the wireless device through a wireless device interface in order to add the compatible energy to the battery.

38 Claims, 14 Drawing Sheets

Related U.S. Application Data filed on Jun. 4, 2015, provisional application No. 62/174,176, filed on Jun. 11, 2015.

(51) Int. Cl.
*H01F 37/00* (2006.01)
*H02J 7/02* (2016.01)
*H04B 1/3883* (2015.01)
*H02J 50/20* (2016.01)

(58) Field of Classification Search
USPC ............................................. 320/108
See application file for complete search history.

(56) References Cited

U.S. PATENT DOCUMENTS

| | | | |
|---|---|---|---|
| 2013/0345695 A1* | 12/2013 | McPherson | A61B 18/1206 606/34 |
| 2014/0184137 A1 | 9/2014 | Huang et al. | |

OTHER PUBLICATIONS

Chi-Chih Chen, J.L. Volakis, U. Olgun, "Efficient ambient WiFi energy harvesting technology and its applications," Antennas and Propagation Society International Symposium (APSURSI), 2012 IEEE, Jul. 8, 2012. (http://ieeexplore.ieee.org/xpls/abs_all.jsp?arnumber=6349384).

Adnan Harb, "Energy Harvesting: State-of-the-art," 36 Renewable Energy 10, Oct. 1, 2011, 2641. (http://www.sciencedirect.com/science/article/pii/S0960148110002703).

Y.S. Song, T.T. Jeong, H. Jabbar, "RF energy harvesting system and circuits for charging of mobile devices," Consumer Electronics, IEEE Transactions, vol. 56, Issue 1, Feb. 1, 2010. (http://ieeexplore.ieee.org/xpls/abs_all.jsp?arnumber=5439152).

P.D. Mitcheson, S. Lucyszyn, M. Pinuela, "Ambient RF Energy Harvesting in Urban and Semi-Urban Environments," IEEE Transactions on Microwave Theory and Techniques, vol. 61, Issue 7, Jul. 1, 2013. (http://ieeexplore.ieee.org/xpls/abs_all.jsp?arnumber=6519964&tag=1).

U. Olgun, C.-C. Chen, J.L. Volakis, "Design of an efficient ambient WiFi energy harvesting system," Microwaves, Antennas & Propagation, IET, vol. 6, Issue 11, Aug. 21, 2012. (http://ieeexplore.ieee.org/xpl/articleDetails.jsp?arnumber=6329093).

U. Olgun, Chi-Chih Chen, J.L. Volakis, "Investigation of Rectenna Array Configurations for Enhanced RF Power Harvesting," Antennas and Wireless Propagation Letters, IEEE vol. 10, Apr. 5, 2011. (http://ieeexplore.ieee.org/xpls/abs_all.jsp?arnumber=5741826&tag=1).

Shabnam Ladan and Ke Wu, "35 GHz harmonic harvesting rectifier for wireless power transmission," Microwave Symposium (IMS), 2014 IEEE MTT-S International, Jun. 1, 2014. (http://ieeexplore.ieee.org/xpls/abs_all.jsp?arnumber=6848572&tag=1).

Search Report from PCT application No. PCT/US2015/055461 dated Jun. 23, 2017.

* cited by examiner

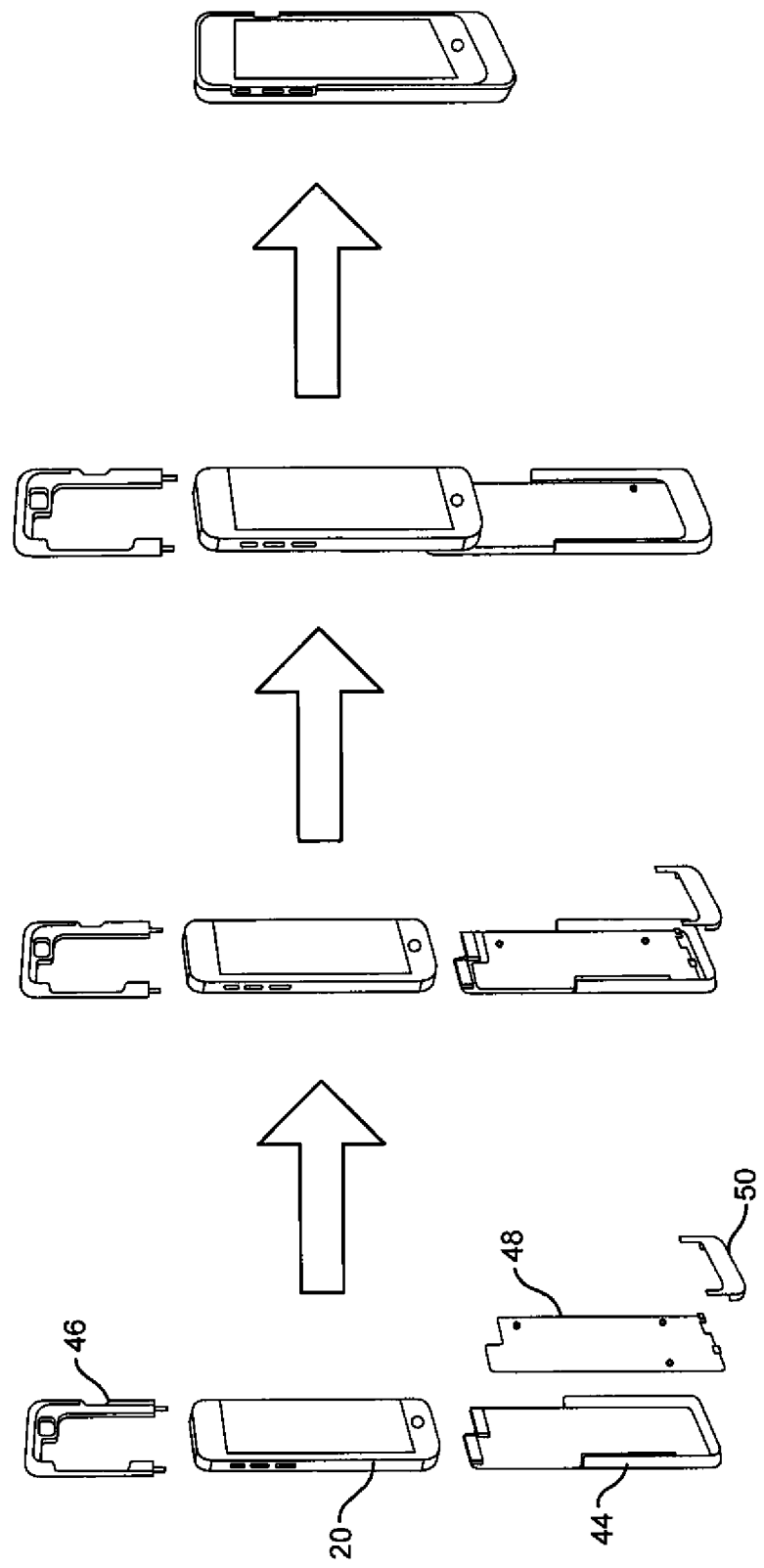

SYSTEMS CAPABLE OF SELF-HARVESTING ENERGY FROM WIRELESS DEVICES AND METHODS OF USING THE SAME

RELATED APPLICATIONS

This application claims priority to U.S. Provisional Patent Application No. 62/174,176 filed on Jun. 11, 2015 entitled Systems Capable of Self-Harvesting Energy From Wireless Devices and Methods of Using the Same; U.S. Provisional Patent Application No. 62/171,099 filed on Jun. 4, 2015 entitled Energy Harvesting System for Use with Wireless Devices and Methods of Using the Same; and U.S. Provisional Patent Application No. 62/063,432 filed on Oct. 14, 2014 entitled Energy Harvesting Wireless Mobile Device. Those applications are herein incorporated by reference in their entirety.

FIELD OF INVENTION

The disclosure relates to a system capable of collecting radio frequency energy from an associated wireless device and converting it into direct current (DC) power for use in prolonging or extending the battery life of associated wireless devices. More specifically, the disclosure is related to energy harvesting systems that may be embedded into a protective case or cover of or otherwise attached to a wireless device, such as a phone or tablet, in order to collect and convert radio frequency energy from that device for use in prolonging or extending the battery life of the wireless device battery.

BACKGROUND

In use, only a small fraction of the radio frequency (RF) energy transmitted by smartphones and other wireless devices is used to communicate with a wireless access point, such as a cellular base station or a wireless network router. This is because small wireless devices, including mobile wireless devices, transmit RF signals in all directions from the device in order to ensure uninterrupted communication, regardless of the orientation of the wireless device.

It would be useful to collect or harvest the unused RF signals in order to convert them, for example, to direct current (DC) power and supplement the capacity of the wireless device battery. However, existing RF energy harvesting designs have been unable to efficiently collect and convert RF signals sent on different frequencies and at different signal strengths without adversely affecting the cellular signal strength and data transmission rates.

SUMMARY

In one embodiment, a system is configured to self-harvest at least a portion of radio frequency signals transmitted by an associated wireless device that is configured to transmit radio frequency signals and convert the collected radio frequency signals from radio frequency signals to a direct current signal compatible with charging requirements of the wireless device in order to supplement an electrical charge of a battery electrically connected to the wireless device.

In another embodiment, a wireless device is configured to transmit radio frequency signals and to self-harvest energy from the radio frequency signals transmitted in order to supplement an electrical charge of a battery electrically connected to the wireless device. The wireless device may include a self-harvesting system that is configured to collect at least a portion of the radio frequency signals transmitted by the wireless device and convert the collected radio frequency signals from radio frequency signals to a direct current signal compatible with charging requirements for the battery. The system may include a set of converting circuitry configured to convert at least some of the radio frequency signals transmitted by the wireless device to a direct current signal, a set of power management circuitry electrically connected to the set of converting circuitry, wherein the set of power management circuitry is configured to produce the direct current power compatible with charging requirements for the battery, and a wireless device interface electrically connected to the set of power management circuitry, wherein the wireless device interface is configured to transfer the direct current power produced by the set of power management circuitry to the battery of the wireless device.

In another embodiment, a method of self-harvesting energy from a wireless device and supplementing the battery power of the wireless device using the self-harvested energy includes the steps of collecting at least a portion of radio frequency signals transmitted by the wireless device; converting the collected radio frequency signals from radio frequency signals to direct current energy; further converting the direct current energy to energy compatible with charging requirements for a battery electrically connected to the wireless device; and transferring the compatible energy to the battery of the wireless device through a wireless device interface in order to add the compatible energy to the battery.

BRIEF DESCRIPTION OF THE DRAWINGS

The accompanying figures, which are incorporated in and constitute a part of the specification, illustrate various example systems, apparatuses, and methods, and are used merely to illustrate various example embodiments. In the figures, like elements bear like reference numerals.

FIGS. 11(a-c) are exploded plan views of an embodiment of a protective cover including an RF energy harvesting system used with an associated smartphone.

FIG. 11d is an assembled plan view of the protective cover of FIGS. 11(a-c) in use with an associated smartphone.

FIG. 12b is a bottom view of the motherboard of FIG. 12a.

DETAILED DESCRIPTION

Wireless devices transmit RF signals to surrounding wireless access points, such as cellular towers, when the device user sends or receives an email, makes a phone call, or searches the internet. As used herein, the phrase "RF signal," can mean electromagnetic radiation having wavelengths that correspond to a frequency band from about 3 kHZ to about 300 GHz. However, only a small portion of those signals are actually used for proper communication. In one embodiment, a RF energy harvesting system may be connected to the wireless device in order to enable that device to "self-harvest" its own radio frequency signals. For example, when transmitted from the phone, the near-field RF signals from the phone that are not used for data or voice communication are collected by the associated system, converted from RF to DC power, and charged back to the battery of the phone, prolonging the time that it takes to deplete the battery's charge. This type of self-collection will be referred to as a device's ability to "self-harvest" its own radio frequency signals by using an associated RF energy harvesting system. In one embodiment, use of the system with an associated wireless device reduces the battery consumption rate by up to 30% without affecting the device's communication quality or data rate. Batteries of wireless devices have a certain amount of capacity, for example—a certain amount of data or communications that the device can process, usually measured over a length of time. This amount of time that it takes for the battery to deplete a 100% charge to 0% charge is commonly referred to as the "life" of the battery. It should be understood that the RF energy harvesting system does not add to the capacity of the battery. Rather, the system adds an electrical charge to the battery, thereby prolonging or extending the life of that battery and increasing the length of time that it takes or the amount of data that can be transmitted and received before a particular battery is drained to 0% of its charge.

For the purpose of this description, the wireless device will be referred to as a "phone" but it should be understood that the wireless device may be any device, mobile or not, that wirelessly sends and receives RF signals. Moreover, the energy harvesting system will be described as embedded in a case or cover for the phone, but it should also be understood that the system may be connected to the phone by other means including, but not limited to, being embedded in the phone itself, removably or fixedly attached to a removable case or cover for the phone, and removably attached to the phone.

Figure 1:
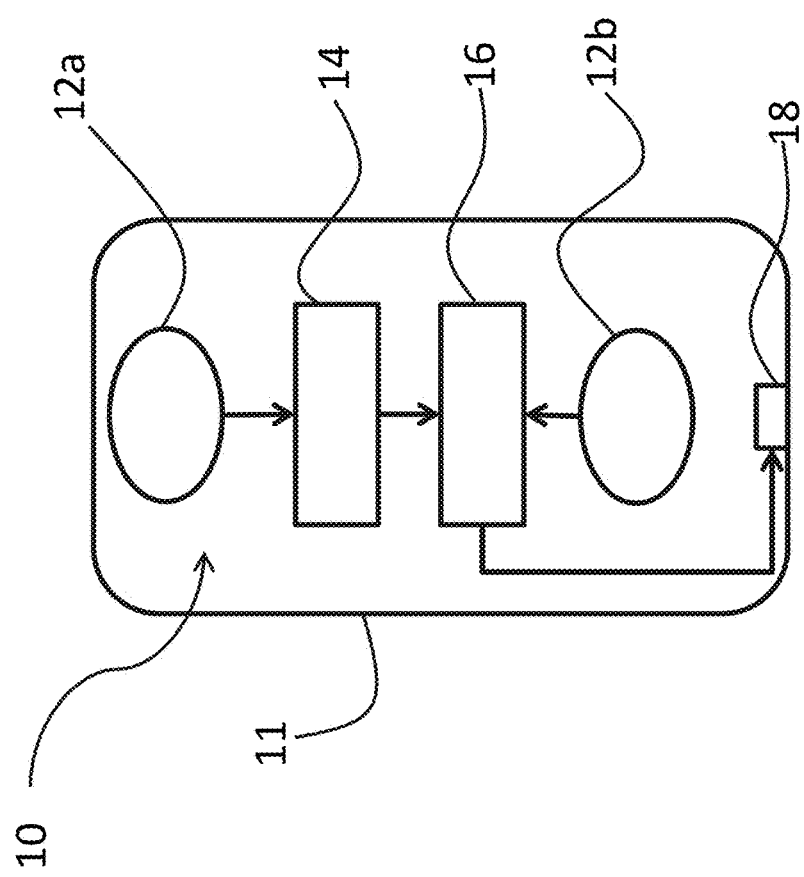
FIG. 1 is a schematic representation of one example of a wireless device cover including a RF energy harvesting system.

Referring now to FIG. 1, in one embodiment an RF energy harvesting system 10 ("the system") may be embedded in a case or protective cover 11 for a smartphone (hereinafter "the phone"). The system 10 may include one or more receiving antenna 12 that is tuned to receive RF signals within a desired band of frequency. For example, as shown in FIG. 1, the system 10 may include a first receiving antenna 12a for harvesting Wi-Fi RF signals and a second receiving antenna 12b configured to harvest cellular RF signals (e.g., frequencies corresponding to 3G, 4G, CDMA, or the like). The system 10 may also include signal converting circuitry 14 configured to convert the energy collected from the receiving antenna(s) 12 from alternating current (AC) power to direct current (DC) power. The system 10 may further include power management circuitry 16 configured to produce DC power capable of adding an electrical charge to a phone battery. Finally, the system 10 may also include a wireless device interface 18 configured to connect the system 10 to the phone. It is noted that the Figures provided herein can utilize arrowed lines or lines terminated in dots to indicate that components are electrically connected. It is furthermore noted that the phrase "electrically connected" can mean a conductive path is provided directly between multiple components or indirectly between two components with an interceding component such that an electrical signal can be transmitted via the conductive path.

Figure 2:
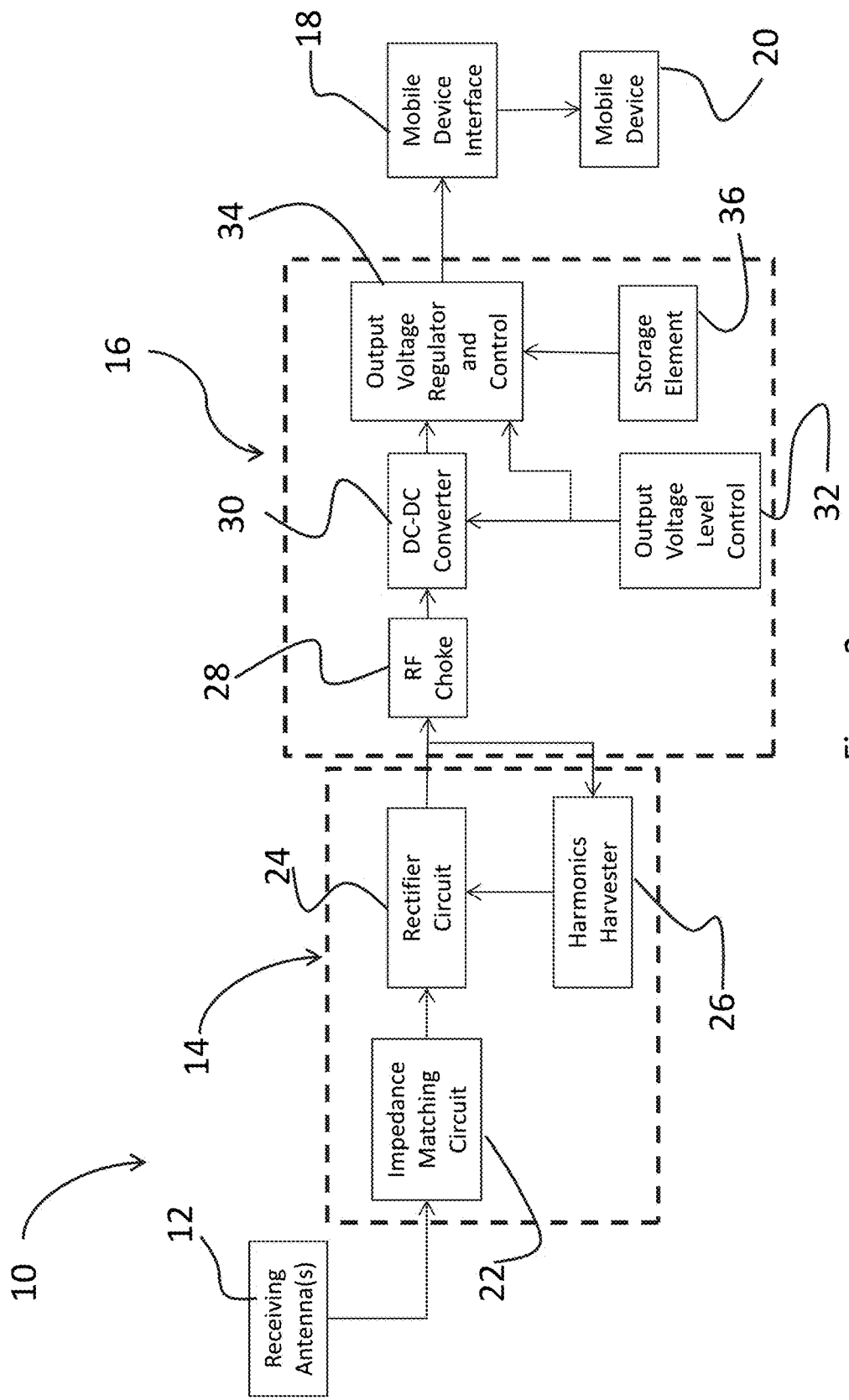
FIG. 2 is a schematic representation of another embodiment of the RF energy harvesting system.

Referring now to FIG. 2, in another embodiment, the system 10 includes at least one receiving antenna 12, a set of converting circuitry 14, an RF choke 28, a set of power management circuitry 16, and a wireless device interface 18 configured to communicate with the wireless device/phone 20. First, the receiving antenna 12 may be designed to mitigate energy loss during the reception of the energy from the phone, while not interfering with the cellular and data transmission rates. Most smartphones use multiple antennas, installed at different locations around the phone, to send and receive RF signals of different signal levels and at different frequency bands. For example, Wi-Fi signals have relatively low signal levels (<−20 dBm) and transmit at frequency bands of about 2.45 GHz and about 5.9 GHz, while cellular signals transmit at frequency bands of about 800 MHz and about 1800 MHz. So, more than one receiving antenna 12 may be required in the system 10 in order to accommodate the different transmissions. Also, each receiving antenna 12 must be disposed in close proximity to the respective transmitting antenna on the phone. In one embodiment, the receiving antenna 12 is placed as far away as possible from the phone's transmitting antenna while producing 1) sufficient unregulated rectified voltage to turn on the power management circuitry 16 and 2) sufficient regulated rectified voltage to add a compatible charge to the wireless device 20. It should be understood that the placement of the receiving antenna 12 relative to the corresponding transmitting phone antenna will vary depending on the design of the phone, the topology and efficiency of the converter circuitry 14, and the turn-on voltage threshold of the power management circuitry 16. In another embodiment, the receiving antenna 12 is disposed a predetermined number of wavelengths from the transmitting antenna of the associated wireless device 20. It should be understood that the predetermined number will vary depending on the design of the associated wireless device 20.

Figure 3:
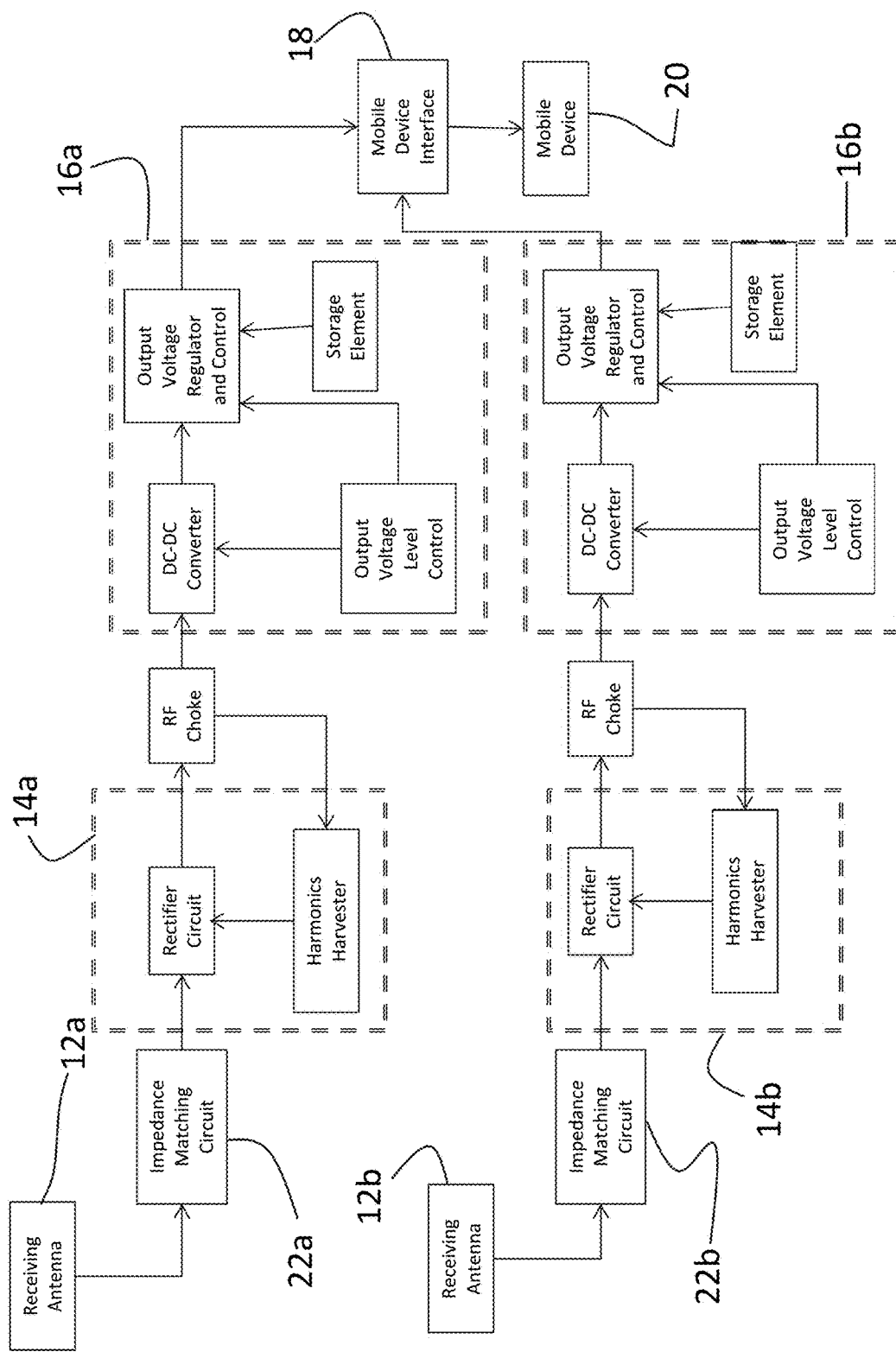
FIG. 3 is a schematic representation of another embodiment of the RF energy harvesting system.
Figure 4:
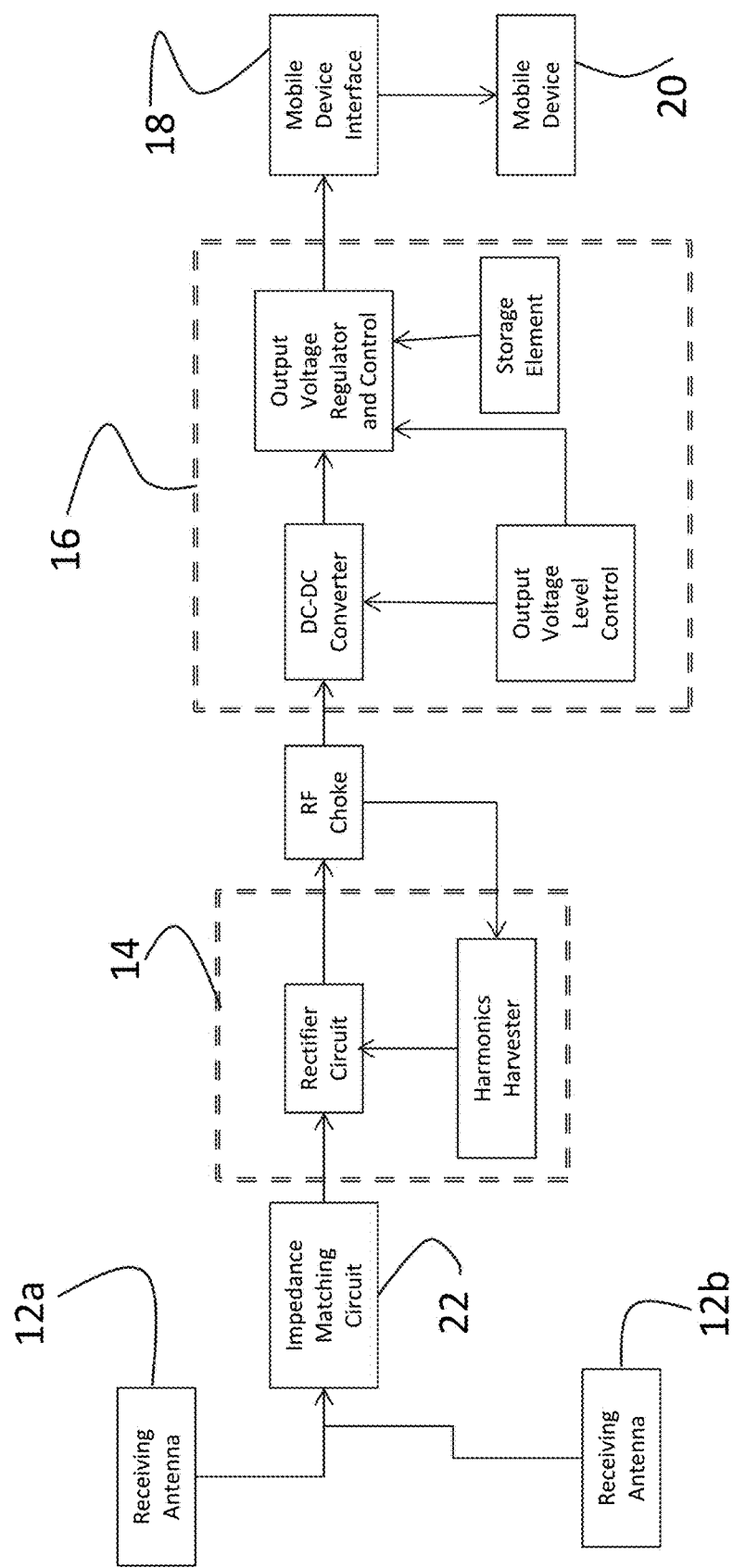
FIG. 4 is a schematic representation of another embodiment of the RF energy harvesting system.

As shown in FIGS. 3 and 4, the signals collected by multiple receiving antennas 12 can be combined using at least two different methods. First, as illustrated in FIG. 3, the signals may be collected by separate receiving antenna 12a and 12b and combined only after the power management circuitries 16a and 16b have converted the AC power to DC power. This method includes two separate energy harvesting systems embedded in to the case or cover. This configuration can improve rectifying efficiency because the impedance matching circuitries 22a and 22b and the converter circuitries 14a and 14b can be tuned (i.e., per the maximum power-transfer theorem) separately for each frequency band of signal being received. Specifically, the impedance can be matched to the output impedance of the associated receiving antenna at its frequency band of operation. However, this configuration does consume more space and include more components.

As shown in FIG. 4, the outputs of the receiving antennas 12a and 12b may be combined before being transmitted through the impedance matching circuit 22. Although this configuration requires less components, cutting down on both cost and space, a reduction in rectifying efficiency can be observed for each frequency band of signals being received.

Once the energy is collected by the receiving antenna 12, the energy is transmitted through the impedance matching circuit 22 and the converting circuitry 14. The converting circuitry 14 includes a rectifier circuit 24. The impedance matching circuit 22 is configured to mitigate losses and increase the amount of AC power collected by the receiving antenna 12 and transmitted to the rectifying circuit 24. It should be understood that any suitable impedance matching circuit 22 may be used in the system 10. The impedance matching circuit 22 then transmits the collected AC power to the rectifier circuit 24 to be converted to DC power. The rectifier circuit 24 can comprise any device capable of converting the collected AC power to DC power such as, for example, a half-wave rectifier or a full-wave rectifier. In one embodiment, the rectifier circuit 24 can be configured to provide full-wave rectification of the AC power. Accordingly, the rectifier circuit 24 can comprise low barrier Schottky diodes in a two-stage Dickson charge pump topology.

Referring again to FIG. 2, using the two-stage Dickson charge pump topology has been found to quadruple the output voltage of the rectifier circuit 24, helping to ensure that the voltage at the input of the management and storage circuitry 16 is sufficiently high. However, it is contemplated that other topologies may be used. It should be understood that the rectifier circuit 24 can be specifically tuned for the specific signal levels and frequency associated with the target phone to improve AC to DC conversion efficiency.

In an alternative embodiment, the converting circuitry 14 may include a harmonics harvester 26 to improve the efficiency of power conversion from AC to DC power. One such harmonics harvester 26 is described in International Application No. PCT/US14/70087, filed on Dec. 12, 2014, the entirety of which is incorporated herein by reference.

Once converted from AC to DC power, the energy is transmitted through an RF choke 28 to the power management circuitry 16. The RF choke 28, in one embodiment an inductor, is used to block any unconverted AC power, while passing the DC power to the power management circuitry 16. The power management circuitry 16 is used to regulate the harvested DC power and ensure that it is compatible with the charging requirements of the target phone.

In one embodiment, the power management circuitry 16 operates in two stages. First, the DC voltage from the RF choke 28 is stepped up to a higher voltage level using a DC to DC converter 30. For example, the DC voltage from the choke 28 may be stepped up to about 4.2V to about 5.1V using the DC to DC converter 30. The resulting voltage level will be determined by the charging requirements for the associated phone and specified by the output voltage level control circuit 32. Secondly, an output voltage regulation and control circuit 34 maintains a steady output voltage from the DC to DC converter 30. The power management circuitry 16 may also be configured to divert its output to charge an attached power storage device 36, such as a capacitor or a rechargeable battery.

Finally, the DC power is transferred from the output voltage regulator and control circuit 34 through the wireless device interface 18 to the wireless device 20. The design of the wireless device interface 18 will vary depending on the connector type for a specific wireless device 20. For example, the wireless device interface 18 can be configured to comply with bus standards such as, but not limited to, Universal Serial Bus (USB), micro-USB, Lighting, or the like.

Example 1

Figure 5:
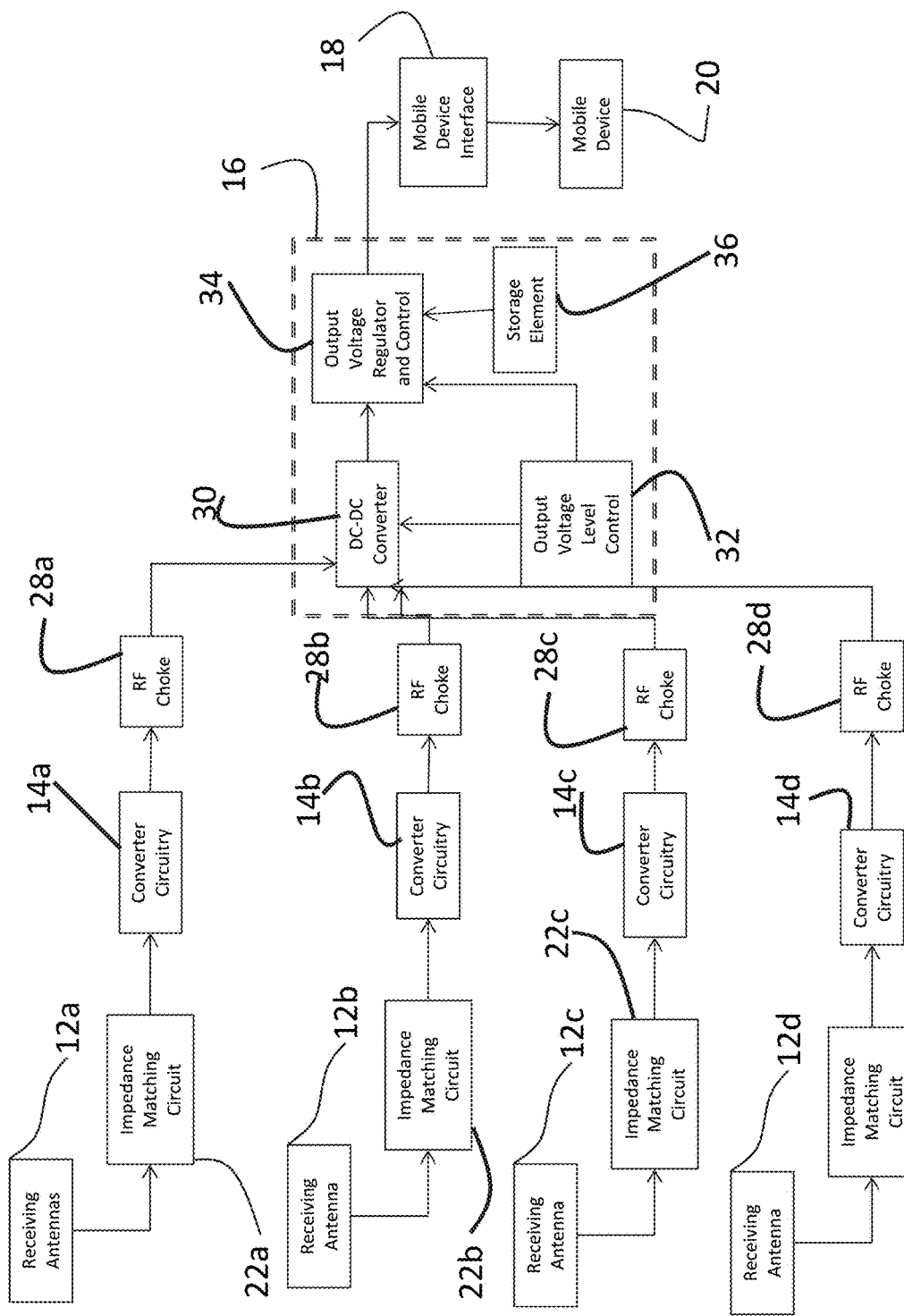
FIG. 5 is a schematic representation of the circuitry used in one embodiment of an RF energy harvesting system.

FIG. 5 illustrates an example of the circuitry used in a RF energy harvesting system. In this embodiment, at least four antennas 12a-d are used to collect RF signals in multiple cellular and Wi-Fi bands. Each antenna 12a-d is followed by an impedance matching circuit 22a-d tuned for efficient power transfer from the antenna to the converter circuitry 14a-d. In this embodiment, each set of converter circuitry 14a-d comprises a Dickson charge pump rectifier circuit that rectifies the alternating RF signals (AC) in to DC voltage via low-barrier Schottyky diodes. The DC voltage outputs of all rectifier circuits 14a-d are then filtered through an RF choke 28a-d and combined together and transmitted to the input of the power management circuitry 16.

The power management circuitry 16 is used to regulate the harvested DC voltage to ensure it is compatible with the charging requirements of the associated wireless device, in one example an iPhone 6 which requires about 5V of power to add a compatible charge to the battery. In some embodiments, the DC to DC converter 30 of the power management circuitry 16 can be provided as an power management integrated circuit such as, but not limited to, BQ25504RGTT by Texas Instruments of Dallas, Tex., USA. First, the DC to DC converter 30 is activated when the combination of outputs from the converter circuitries 14a-d reaches 330 mV. When activated, the power at the DC to DC converter's 30 input is extracted and it begins charging output capacitors (or any other storage device) 36 to 5.10V. The output voltage level is set by an output voltage level control 32. In this embodiment, the output voltage level control 32 includes a voltage divider composed of two resistors.

An output voltage regulator and control circuit 34 is connected to the output of the DC to DC converter 30. In this embodiment the output voltage regulator and control circuit 34 may be a PFET load switch such as, but not limited to, a TPS229xx load switch by Texas Instruments. The output voltage regulator and control circuit 34 ensures that the output of the DC to DC converter 30 is connected to the associated wireless device only when the output voltage is compatible with the charging voltage requirement of that device.

As the voltage rises and reaches 5.02V in the storage device 36, a control signal from the DC to DC convertor 30 jumps from 0V to the voltage dictated by the output voltage level control 32, which turns on the output voltage regulator and control circuit 34 and begins charging the wireless device 20 through the wireless device interface 18. During charging, the voltage will start to decrease as the electrical energy stored in the storage device 36 is transferred to the device's battery. When the voltage in the storage device 36 drops to 4.20V, the output voltage regulator and control circuit 34 will turn off and disconnect the wireless device 20 from the power management circuitry 30. This allows the voltage to rise back to 5.016V by charging the storage device 36, at which point the process repeats.

Example 2

Figure 6:
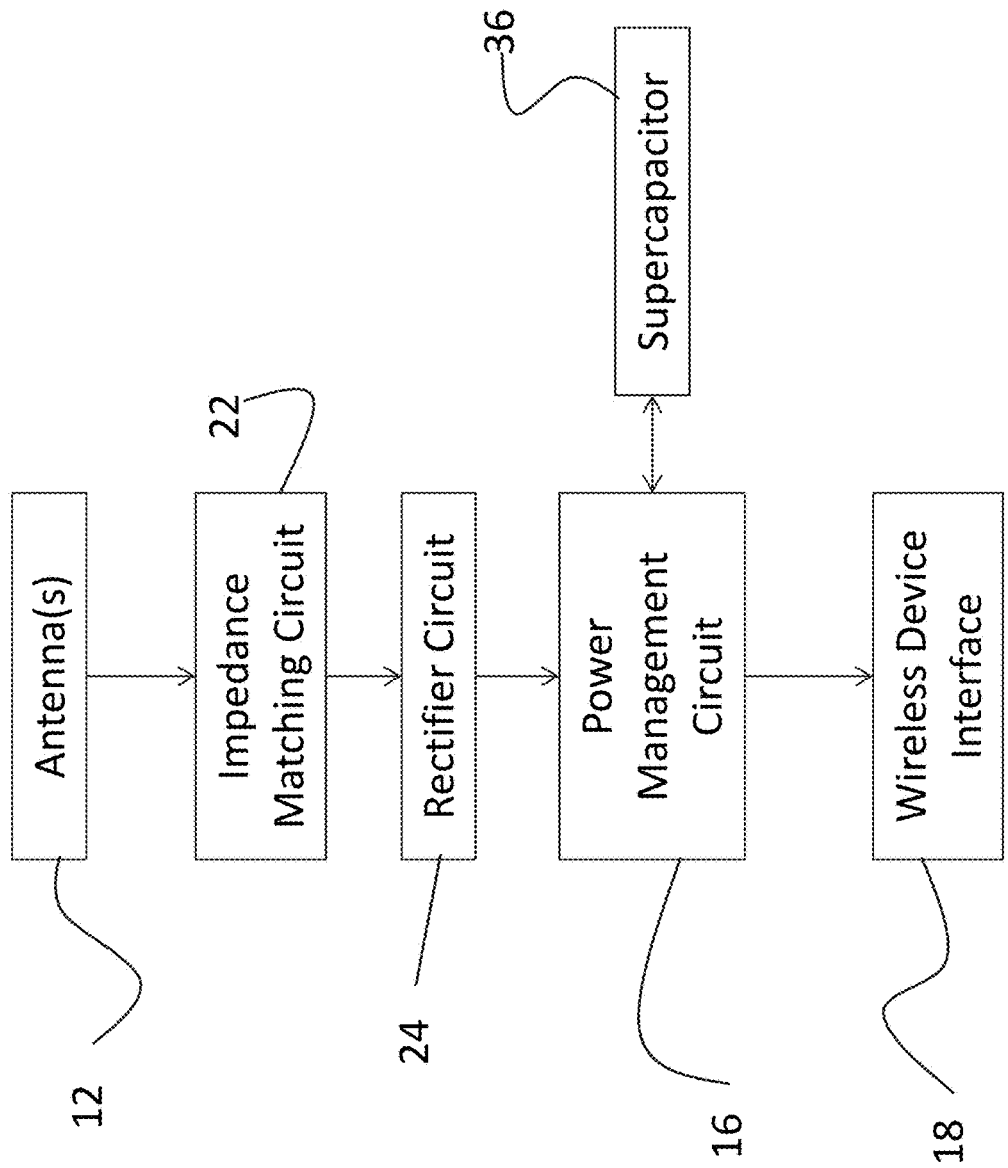
FIG. 6 is a flow chart illustrating another embodiment of the RF energy harvesting system.
Figure 7:
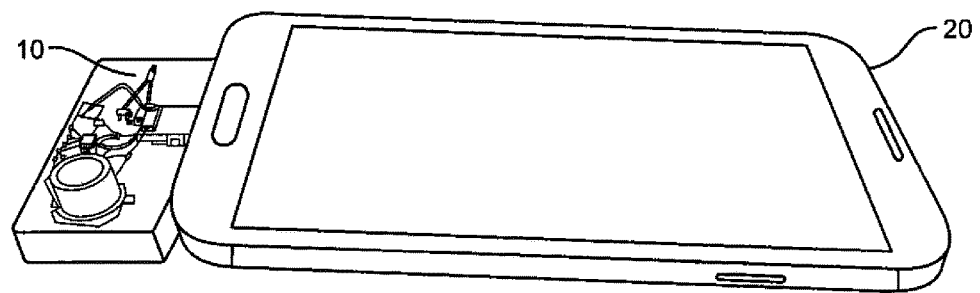
FIG. 7 is a plan view of one embodiment of the RF energy harvesting system attached to a smartphone.
Figure 8:
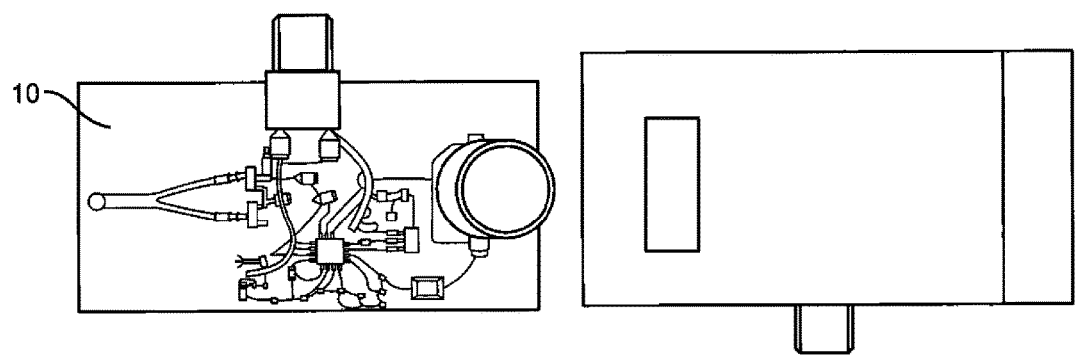
FIG. 8 is a top view and a bottom view of the RF energy harvesting system of FIG. 7.

Referring now to FIGS. 6, 7, and 8, a sample system 10 was fabricated. The sample system 10 includes an antenna 12, an impedance matching circuit 22 including a single stub tuner, a rectifier circuit 24 including low barrier Schottky diodes in a two-stage Dickson charge pump topology, a commercial power management circuit 16, a storage device 36, and a wireless device interface 18. As shown in FIG. 7, the sample system 10 was connected to a smartphone 20. It was found that when the input power was high enough, the energy management circuit charges the phone 20 with a regulated output voltage. When the input power was not high enough to charge the phone 20, the power management circuit 16 disconnects the device from the phone 20 and stores the harvested energy in a storage element 36, in this example a super capacitor shown as a large circular device in FIGS. 7 and 8. When the energy stored in the storage device 36 became high enough again, the power management circuit 16 automatically reconnected the system to the phone in order to charge the battery. It was also found that energy was stored in the storage device 36 when the system 10 was not connected to the phone 20, but was in close proximity to the phone.

Figure 9:
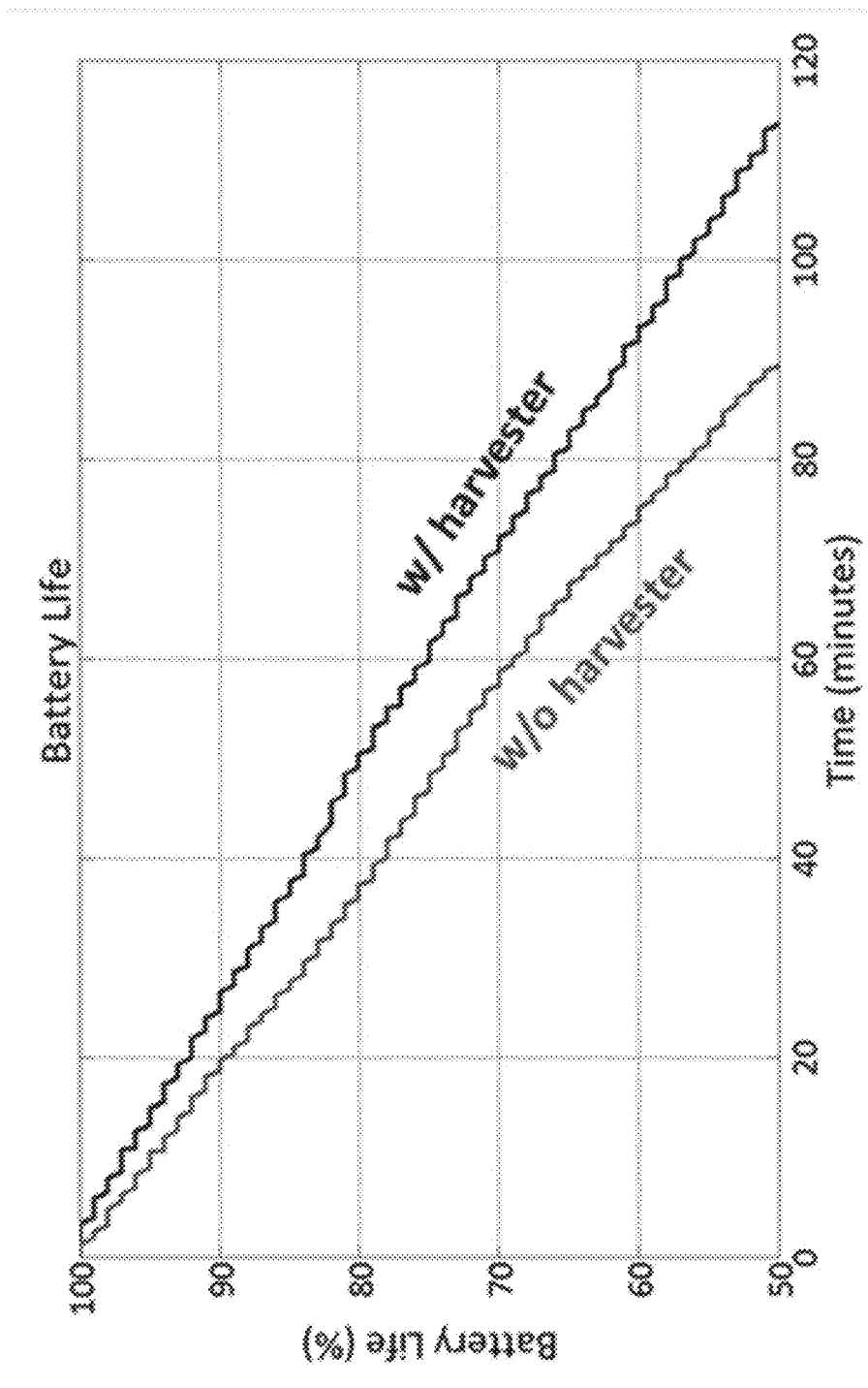
FIG. 9 is a chart illustrating the discharging behavior of a smartphone battery equipped with and without the RF energy harvesting of FIG. 8 system over time.
Figure 10:
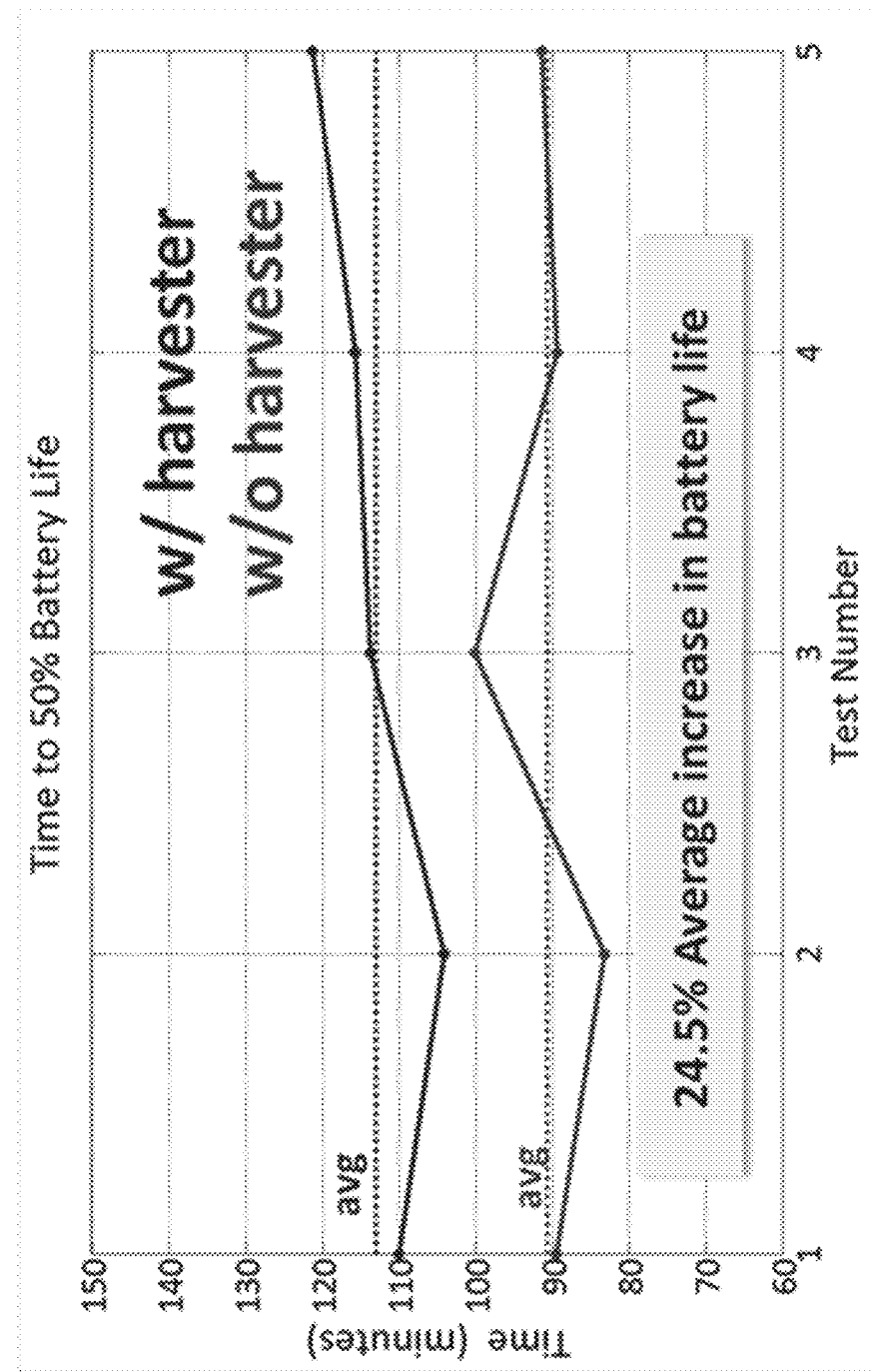
FIG. 10 is a chart illustrating the amount of time needed to exhaust 50% of smartphone battery level for smartphones equipped with and without the RF energy harvesting system of FIG. 8.

The amount of time for a phone's battery capacity to decrease from 100% to 50% was then compared between a phone with and without the sample system 10 attached. In order to ensure that both phones sent approximately the same amount of data, the test was conducted while each phone constantly downloaded a large file using a cellular network. As shown in FIGS. 9 and 10, the battery consumption rate decreased by an average of about 24.5% when the sample system 10 was used with the phone 20. However, it is expected that under normal usage conditions, i.e. not under a constant data download, the battery consumption when using the system 10 will decrease by a much larger percentage.

Example 3

Figure 12A:
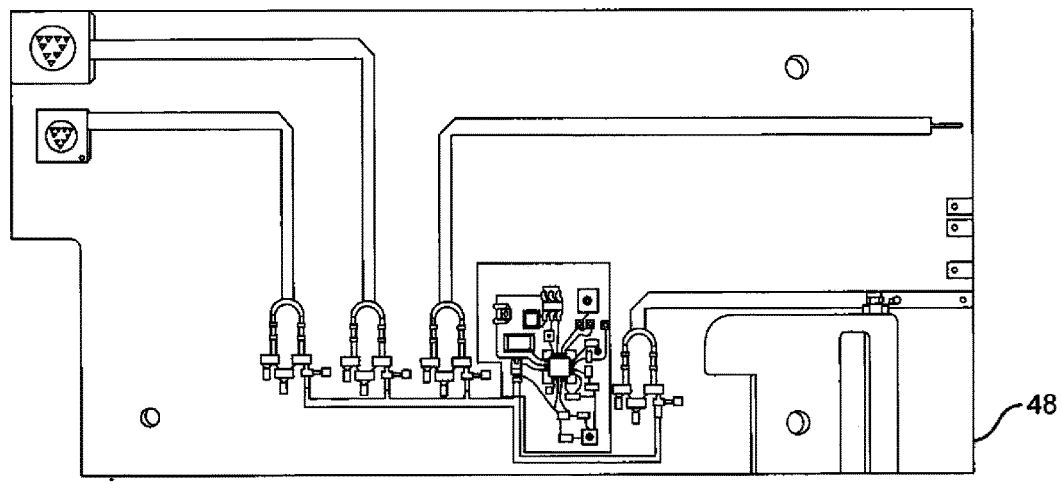
FIG. 12a is a top view of one embodiment of a motherboard embedded with the RF energy harvesting system.
Figure 12B:
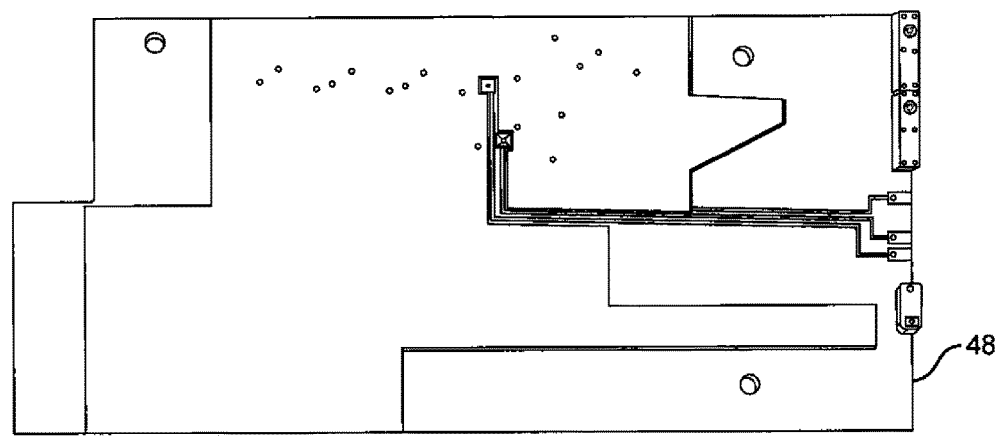

FIGS. 11a-c show an exploded view of a sample phone case for an iPhone 6 embedded with the system. As shown in FIG. 11a, for example, the phone case may include a case body 44, a case cap 46, a front plate 50, and a motherboard 48 on which the system may be embedded. The motherboard 48 may be disposed between the case body 44 and the front plate 50. The phone 20 may then be inserted between the motherboard 48 and the front plate 50 and the case cap 46 disposed about the top of the phone 20 to secure it in place, as shown in FIG. 11d. The front and back of a sample motherboard 48 are shown in FIGS. 12a and 12b, respectively. In this example, the motherboard 48 includes four antennas to harvest RF energy in two Wi-Fi bands (2.4 GHz and 5.8 GHz) and two LTE bands (800 MHz and 1800 MHz). In this example, the harvested DC power is charged back to the phone battery through an iPhone lightning connector at the bottom of the case.

Figure 13:
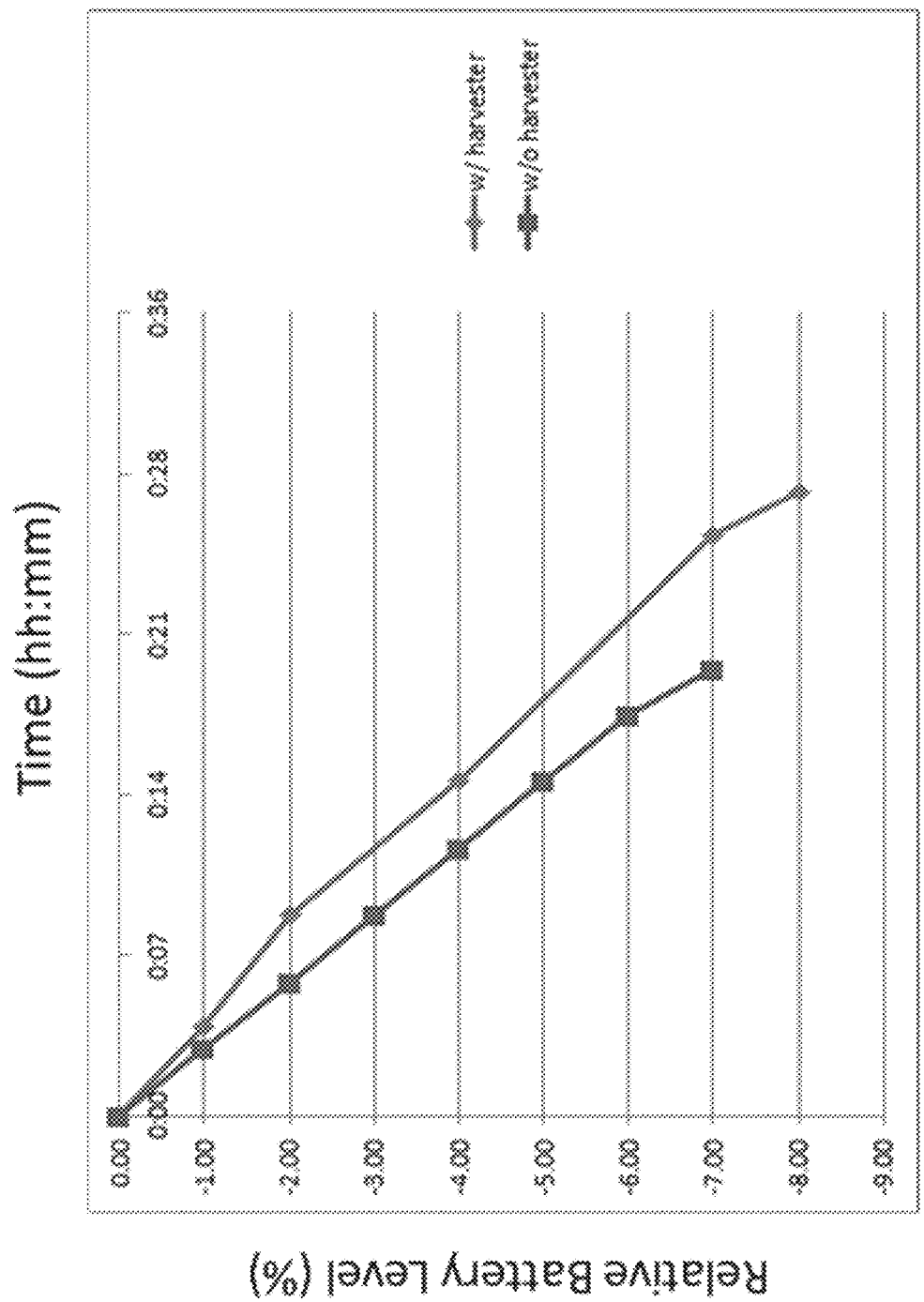
FIG. 13 is a chart illustrating the decrease over time in battery level by percentage of charge for smartphones equipped with and without an RF energy harvesting system.
Figure 14:
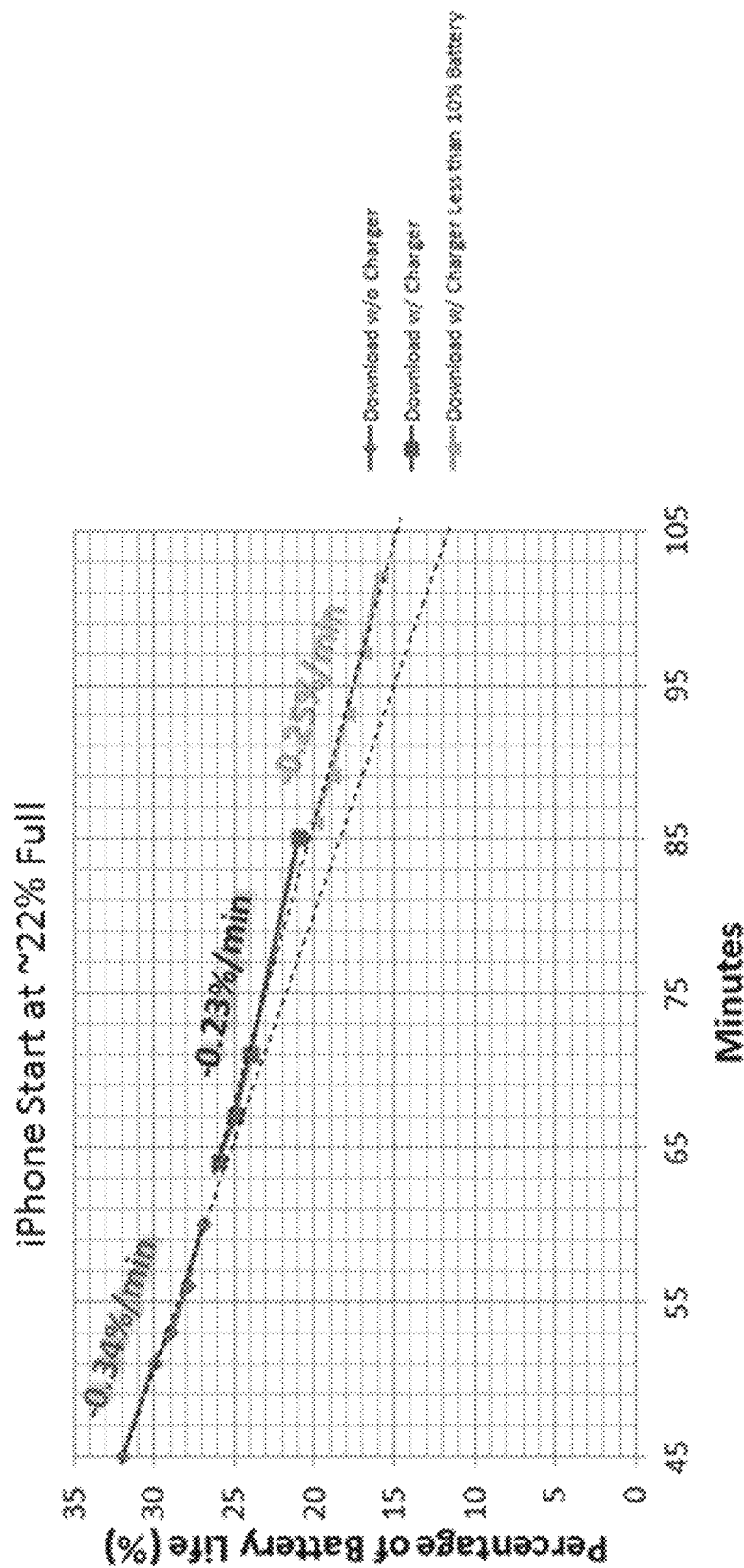
FIG. 14 is a chart illustrating the per minute percentage of decrease in battery level for smartphones equipped with and without an RF energy harvesting system.
Figure 15:
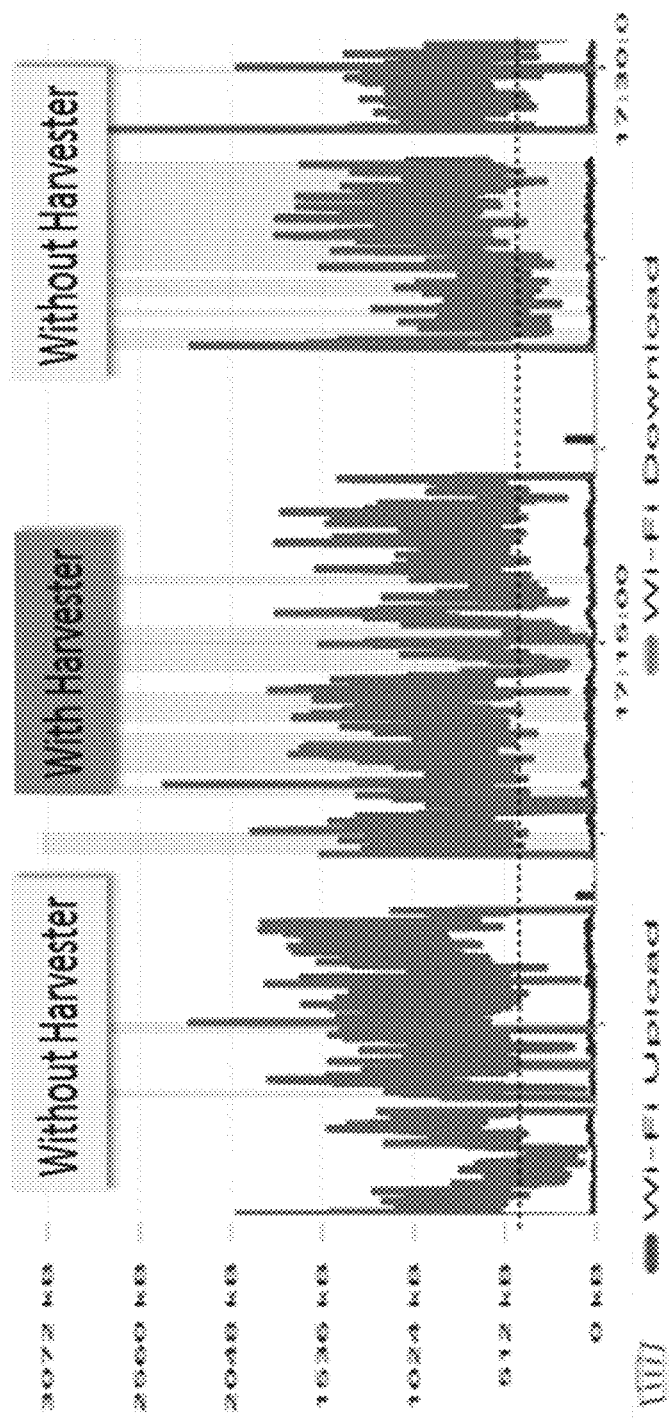
FIG. 15 is a graphical representation of the effect of the use of an RF energy harvesting system on the data rate of the associated smartphones equipped with and without a RF energy harvesting system.

As shown in FIG. 13, the iPhone 6 battery discharge rate during continuous data downloading using 2.4 GHz Wi-Fi was tested with and without the case of Example 2. The results showed a 25% reduction in discharging battery rate over time. As shown in FIG. 14, the iPhone 6 battery discharge rate during continuous data downloading using 1750 MHz LTE was tested with and without the case of Example 2. The results also showed a reduction in discharging battery rate over time. During these tests, the data rates of the phones were monitored and recorded to make sure that the presence of the system did not affect the data rate, as demonstrated in FIG. 15. It is believed that the success of this test was due to the careful placement of the receiving antennas of the system relative to the transmitting antennas on the phone. For example, when the phone case is attached to the phone, each receiving antenna can be aligned directly behind the respective transmitting antenna of the phone.

Applicants have discovered that RF energy transmission performance (i.e., communication performance) was not degraded by the self-harvesting system. An embodiment of the system was provided with a phone case for an iPhone 6. The RF energy transmission performance of the iPhone 6 was tested with the phone case and without the phone case. The test results were compared to determine the impact that the self-harvesting system had upon RF energy transmission performance. Specifically, the over-the-air (OTA) total radiated power (TRP) and the OTA total isotropic sensitivity (TIS) of the iPhone 6 with the self-harvesting phone case and the iPhone 6 without the phone case were compared at various communication bands. A difference in performance between the test with the phone case and the test without the phone case of about −1 dB and about 1 dB was within the margin of error for the test. Thus, results between about −1 dB and about 1 dB are considered to indicate that the self-harvesting phone case does not negatively impact data quality.

At Band 2 (1850-1990 MHz), the OTA TRP of the test without the phone case was about 6.62 dBm, the OTA TRP of the test with the phone case was about 6.01 dBm, and the delta OTA TRP was about −0.61 dB. The OTA TIS of the test without the phone case was about −93.49 dBm, the OTA TIS of the test with the phone case was about −93.85 dBm, and the delta OTA TIS was about 0.36 dB. At Band 13 (746-787 MHz), the OTA TRP of the test without the phone case was about 12.05 dBm, the OTA TRP of the test with the phone case was about 12.03 dBm, and the delta OTA TRP was about −0.02 dB. The OTA TIS of the test without the phone case was about −92.19 dBm, the OTA TIS of the test with the phone case was about −91.91 dBm, and the delta OTA TIS was about −0.28 dB. At Band 3 (1710-1880 MHz), the OTA TRP of the test without the phone case was about 9 dBm, the OTA TRP of the test with the phone case was about 10.7 dBm, and the delta OTA TRP was about 1.7 dB. The OTA TIS of the test without the phone case was about −92.78 dBm, the OTA TIS of the test with the phone case was about −91.97 dBm, and the delta OTA TIS was about −0.81 dB. For each of the aforementioned bands, the OTA TRP was within the range demonstrating no degradation in performance due to self-harvesting. Thus, the embodiments described herein can be utilized to reduce battery consumption rates of devices without negatively impacting communication quality or data rate of the devices.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A system comprising:
a first antenna configured to generate a first alternating-current (AC) power signal based on a first received radio-frequency (RF) signal associated with a first frequency band;
a second antenna configured to generate a second AC power signal based on a second received RF signal associated with a second frequency band, wherein the first and second received RF signals are generated by an associated wireless device, wherein the first frequency band is different from the second frequency band;
a signal converting circuit configured to generate a direct-current (DC) power signal having a given amount of power based on the first and the second AC power signals; and
a power management circuit configured to deliver electrical energy to a battery of the associated wireless device based on the given amount of power of the DC power signal.

2. The RF harvesting system claim 1, wherein the RF harvesting system is one of embedded within the associated wireless device and integral with the associated wireless device.

3. The RF harvesting system of claim 1, wherein the RF harvesting system is one of removably attached to the associated wireless device and permanently attached to the associated wireless device.

4. The RF harvesting system of claim 1, further comprising a wireless device interface configured to facilitate the delivery of the electrical energy to the battery of the associated wireless device.

5. The RF harvesting system of claim 1,
wherein the signal converting circuit comprises a first signal converting circuit and a second signal converting circuit, wherein the first signal converting circuit is configured to convert the first AC power signal to a first DC power signal having a first amount of power, and the second signal converting circuit is configured to convert the second AC power signal to a second DC power signal having a second amount of power;
wherein the power management circuit is configured to deliver the electrical energy to the battery of the associated wireless device based on the first amount of power of the first DC power signal and based on the second amount of power of the second DC power signal; and
further comprising a wireless device interface configured to facilitate the delivery of the electrical energy to the battery of the associated wireless device.

6. The RF harvesting system of claim 5,
wherein the first antenna corresponds to a first receiving antenna, wherein the first receiving antenna is disposed in close proximity to a first transmitting antenna of the associated wireless device such that the first receiving antenna is capable of receiving the first RF signal generated by the first transmitting antenna; and
wherein the second antenna corresponds to a second receiving antenna, wherein the second receiving antenna is disposed in close proximity to a second transmitting antenna of the associated wireless device such that the second receiving antenna is capable of receiving the second RF signal generated by the second transmitting antenna.

7. The RF harvesting system of claim 1,
further comprising an impedance matching circuit configured to combine the first AC power signal and the second AC power signal to generate a combined AC power signal;
wherein the signal converting circuit comprises a rectifier circuit and a harmonics harvester circuit;
wherein the rectifier circuit is configured to convert the combined AC power signal to an intermediary DC power signal; and
wherein the harmonics harvester circuit is configured to facilitate an efficiency of the conversion of the combined AC power signal to the intermediary DC power signal.

8. The RF harvesting system of claim 7,
wherein the power management circuit comprises a DC-to-DC converter circuit configured to generate the DC power signal having the given amount of power based on the intermediary DC power signal according to a charging requirement of battery of the associated wireless device; and
wherein the power management circuit further comprises an output voltage regulator and control circuit configured to control delivery of the electrical energy to battery of the associated wireless device based on the given amount of power of the DC power signal.

9. The RF harvesting system of claim 8,
wherein the power management circuit further comprises a storage element;
wherein the DC-to-DC converter is configured to supply the DC power signal to the storage element to store the electrical energy of the DC power signal;
wherein the output voltage regulator and control circuit is configured to retrieve the stored electrical energy of the DC power signal and supply the stored electrical energy to the battery of the associated wireless device; and wherein the power management circuit further comprises an output voltage level control circuit configured to enable the output voltage regulator and control circuit to supply the stored electrical energy of the DC power signal to the battery of the associated wireless device based on a given voltage level of the storage element.

10. The RF harvesting system of claim 5,
wherein each signal converting circuit comprises a rectifier circuit and a harmonics harvester circuit;
wherein the rectifier circuit of each signal converting circuit is configured to convert a respective AC power signal to an intermediary DC power signal; and
wherein the harmonics harvester circuit of each signal converting circuit is configured to facilitate an efficiency of the conversion of the respective AC power signal to the intermediary DC power signal;
wherein each power management circuit further comprises a storage element;
wherein each power management circuit further comprises a DC-to-DC converter circuit configured to generate a corresponding DC power signal based on a respective intermediary DC power signal; and
wherein each DC-to-DC converter is configured to supply the corresponding DC power signal to a respective storage element to store the electrical energy of the corresponding DC power signal;
wherein each output voltage regulator and control circuit is configured to retrieve the stored electrical energy of the corresponding DC power signal and supply the stored electrical energy to the wireless device interface;
wherein the wireless device interface is configured to combine the electrical energy of the corresponding DC power signal from each output voltage regulator and control circuit to generate aggregated electrical energy and deliver the aggregated electrical energy to the battery of the associated wireless device.

11. The RF harvesting system of claim 1,
wherein the first RF signal corresponds to a Wi-Fi signal; and
wherein the second RF signal corresponds to a cellular signal.

12. The RF harvesting system of claim 11,
wherein the first frequency band comprises Wi-Fi signals having a frequency of about 2.45 gigahertz (Ghz) to about 5.9 Ghz; and
wherein the second frequency band comprises cellular signals having a frequency of about 800 megahertz (MHz) to about 1800 Mhz.

13. The RF harvesting system of claim 12,
wherein the first antenna corresponds to a Wi-Fi antenna; and
wherein the second antenna corresponds to a cellular antenna.

14. The RF harvesting system of claim 13, wherein the associated wireless device is one of a phone device and a tablet.

15. The RF harvesting system of claim 4, wherein the wireless device interface comprises one of a Universal Serial Bus (USB), a micro-USB, and a lightning connector.

16. A method comprising:
generating a first alternating-current (AC) power signal based on a first radio-frequency (RF) signal associated with a first frequency band;
generating a second alternating-current (AC) power signal based on a second radio-frequency (RF) signal associated with a second frequency band, wherein the first and second RF signals are generated by an associated wireless device;
generating an electrical signal having a given amount of power based on the first and second AC power signals and based on charging requirements of a battery of the associated wireless device; and
delivering electrical energy via a wireless device interface to the battery of the associated wireless device to supply an electrical charge to the battery of the associated wireless device based on the given amount of power of the electrical signal.

17. The method of claim 16,
wherein generating the electrical signal having the given amount of power based on the first and second AC power signals and based on the charging requirements of the battery of the associated wireless device comprises:
converting the first and the second AC power signals to corresponding intermediary direct-current (DC) power signals;
generating a first DC power signal having a first amount of power based on a respective intermediary DC power signal;
generating a second DC power signal having a second amount of power based on a respective intermediary DC power signal; and
providing a combined DC power signal having a combined amount of power based on the first DC power signal and based on the second DC power signal; and
wherein delivering the electrical energy via the wireless device interface to the battery of the associated wireless device comprises delivering the electrical charge to the battery of the associated wireless device based on the combined amount of power of the combined DC power signal.

18. The method of claim 17, wherein supplying the electrical charge to the battery of the associated wireless device based on the combined amount of power of the combined DC power signal comprises reduces a discharge rate of the battery of the associated wireless device over a period of time.

19. The method of claim 16, further comprising:
combining the first AC power signal and the second AC power signal to generate a combined AC power signal;
converting the combined AC power signal to an intermediary DC power signal;
wherein generating the electrical signal having the given amount of electrical energy based on the first and second AC power signals and based on the charging requirements of the battery of the associated wireless device comprises generating a DC power signal having a given amount of power based on the intermediary DC power signal and based on the charging requirement of the associated wireless device; and
wherein delivering the electrical energy via the wireless device interface to the battery of the associated wireless device to supply the electrical charge to the battery comprises controlling delivery of electrical energy of the DC power signal to the battery of the associated wireless device based on the given amount of power of the DC power signal.

20. The method of claim 19,
wherein controlling delivery of electrical energy of the DC power signal to the battery of the associated wireless device based on the given amount of power of the DC power signal comprises:
supplying the DC power signal to a storage element to store the electrical energy of the DC power signal;
monitoring a voltage level of the storage element relative to a first voltage level threshold;
delivering the stored electrical energy at the storage element to the battery of the associated wireless device in response to the voltage level of the storage element being equal to the first voltage level threshold;
monitoring the voltage level of the storage element relative to a second voltage level threshold during delivery of the stored electrical energy to the battery of the associated device; and
stopping delivery of the stored electrical energy to the battery of the associated device in response to the voltage level of the storage element being equal to the second voltage level threshold.

21. A radio frequency (RF) energy harvesting system comprising:
a first antenna configured to generate a first alternating-current (AC) power signal based on a first RF signal associated with a first frequency band, wherein the first antenna is disposed in close proximity to a first transmitting antenna of an associated wireless device such that the first antenna is capable of receiving the first RF signal generated by the first transmitting antenna;
a second antenna configured to generate a second AC power signal based on a second RF signal associated with a second frequency band, wherein the second antenna is disposed in close proximity of a second transmitting antenna of the associated wireless device such that the second antenna is capable of receiving the second RF signal generated by the second transmitting antenna;
a set of signal converting circuits configured to convert a respective AC power signal to an intermediary direct current (DC) power signal;
a set of power management circuits configured to generate a respective DC power signal having a given amount of electrical energy based on a given amount of power of a respective DC power signal and according to charging requirement of a battery of the associated wireless device; and
a wireless device interface configured to combine the generated respective DC power signals and generate a combined DC power signal having a combined amount of electrical energy and delivery the combined DC power signal to the battery of the associated wireless device.

22. The RF energy harvesting system of claim 21, further comprising a set of impedance matching circuits configured to receive the respective AC power signal generated by an associated antenna and supply the respective AC power signal to an associated signal converting circuit of the set of signal converting circuits.

23. The RF energy harvesting system of claim 22, wherein each associated signal converting circuit comprises a rectifier circuit and a harmonics harvesting circuit;
wherein the rectifier circuit of each associated signal converting circuit is configured to convert the respective AC power signal to the intermediary DC power signal; and
wherein the harmonics harvester circuit of each signal converting circuit is configured to facilitate an efficiency of the conversion of the respective AC power signal to the DC power signal.

24. The RF energy harvesting system of claim 23, wherein each power management circuit comprises a DC-to-DC converter circuit configured to generate the respective DC power signal having the given amount of electrical energy based on a respective intermediary DC power signal and according to the charging requirement of the battery of the associated wireless device.

25. The RF energy harvesting system of claim 24, wherein each power management circuit further comprises an output voltage regulator and control circuit configured to control delivery of the respective DC power signal to the wireless device interface.

26. The RF energy harvesting system of claim 25,
wherein each power management circuit further comprises a storage element;
wherein the DC-to-DC converter is configured to supply the respective DC power signal to the storage element to store the electrical energy of the respective DC power signal;
wherein output voltage regulator and control circuit of each power management circuit is configured to retrieve the stored electrical energy of the respective DC power signal and supply the stored electrical energy to the wireless device interface;
wherein each power management circuit further comprises an output voltage level control circuit configured to enable a respective output voltage regulator and control circuit to supply the stored electrical energy to the wireless device interface based on a given voltage level of the storage element; and
wherein the wireless device interface is configured to combined stored electrical energy from each power management circuit to generate combined electrical energy and delivery the combined electrical energy to the battery of the associated wireless device.

27. The RF energy harvesting system of claim 26,
wherein the first RF signal corresponds to a Wi-Fi signal; and
wherein the second RF signal corresponds to a cellular signal.

28. The RF energy harvesting system of claim 27,
wherein the first frequency band comprises Wi-Fi signals having a frequency of about 2.45 gigahertz (Ghz) to about 5.9 Ghz; and
wherein the second band comprises cellular signals having a frequency of about 800 megahertz (MHz) to about 1800 Mhz.

29. The RF energy harvesting system of claim 28, wherein the wireless device interface comprises one of a Universal Serial Bus (USB), a micro-USB, and a Lightning connector.

30. The RF energy harvesting system of claim 29, wherein the associated wireless device is one of an electronic personal communication device, a phone device, and a tablet computer.

31. The RF energy harvesting system of claim 21, wherein the RF energy harvesting system is embedded within the associated wireless device.

32. An energy harvesting system comprising:
a first antenna configured to generate a first alternating-current (AC) power signal based on a first radio-frequency (RF) signal associated with a first frequency band, wherein the first antenna is disposed in proximity to a first transmitting antenna of an associated wireless device such that the first antenna is capable of receiving the first RF signal generated by the first transmitting antenna;

a second antenna configured to generate a second alternating-current (AC) power signal based on a second RF signal associated with a second frequency band, wherein the second antenna is disposed in proximity of a second transmitting antenna of the associated wireless device such that the second antenna is capable of receiving the second RF signal generated by the second transmitting antenna;

an impedance matching circuit configured to combine the first AC power signal and the second AC power signal to generate a combined AC power signal;

a signal converting circuit configured to convert the combined AC power signal to a direct current (DC) power signal;

a power management circuit configured to generate electrical energy for delivery to battery of the associated wireless device based on a given amount of power of the DC power signal; and a wireless device interface configured to supply the electrical energy to the battery of the associated wireless device.

33. The energy harvesting system of claim 32, wherein the energy harvesting system is one of embedded within a case of the associated wireless device and removably attached from the case of the associated wireless device.

34. The energy harvesting system of claim 32,
wherein the signal converting circuit comprises a rectifier circuit and a harmonics harvester circuit;
wherein the rectifier circuit is configured to convert the combined AC power signal to an intermediary DC power signal; and
wherein the harmonics harvester circuit is configured to facilitate an efficiency of the conversion of the combined AC power signal to the intermediary DC power signal.

35. The energy harvesting system of claim 32,
wherein the power management circuit comprises a DC-to-DC converter circuit configured to generate the DC power signal having the given amount of power based on the intermediary DC power signal according to a charging requirement of the battery of the associated wireless device,
wherein the DC-to-DC converter is further configured to supply the DC power signal to a storage element of the power management circuit to store the electrical energy of the DC power signal;

wherein the power management circuit further comprises an output voltage regulator and control circuit configured to retrieve the stored electrical energy of the DC power signal and supply the stored electrical energy to the wireless device interface; and wherein the power management circuit further comprises an output voltage level control circuit configured to enable the output voltage regulator to supply the stored electrical energy to the wireless device interface based on a given voltage level of the storage element.

36. A method comprising:
generating a first alternating-current (AC) power signal based on a first radio-frequency (RF) signal associated with a first frequency band;
generating a second alternating-current (AC) power signal based on a second radio-frequency (RF) signal associated with a second frequency band, wherein the first and second RF signals are generated by an associated wireless device
converting the first and the second AC power signals to intermediary direct-current (DC) power signals;
generating a DC power signal based on the intermediary DC power signals and according to the charging requirement of a battery of the associated wireless device;
supplying the DC power signal to a storage element to store an electrical energy of the DC power signal, wherein supplying the DC power signal corresponds to charging the storage element;
monitoring a voltage level of the storage element relative to a first voltage level threshold in response to supplying the DC power signal to the storage element; and
delivering the stored electrical energy at the storage element to the battery in response to the voltage level of the storage element being equal to the first voltage level threshold.

37. The RF harvesting system of claim 6,
wherein the first receiving antenna is disposed a predetermined number of wavelengths from the first transmitting antenna of the associated wireless device; and
wherein the second receiving antenna is disposed a predetermined number of wavelengths from the second transmitting antenna of the associated wireless device.

38. The RF harvesting system of claim 37, wherein the predetermined number of wavelengths that a respective receiving antenna is disposed from a respective transmitting antenna is a function of one or more parameters of the associated wireless device.

* * * * *